(12) United States Patent
Yamada

(10) Patent No.: US 6,336,795 B1
(45) Date of Patent: Jan. 8, 2002

(54) FLUID DISPLACEMENT APPARATUS WITH SUCTION REED VALVE STOPPER

(75) Inventor: Hitoshi Yamada, Gunma (JP)

(73) Assignee: Sanden Corporation, Gunma (JP)

( * ) Notice: Subject to any disclaimer, the term of this patent is extended or adjusted under 35 U.S.C. 154(b) by 0 days.

(21) Appl. No.: 09/584,666

(22) Filed: Jun. 1, 2000

(30) Foreign Application Priority Data

Jun. 1, 1999 (JP) .............................................. 11-153843

(51) Int. Cl.$^7$ ........................... F04B 39/10; F04B 53/10
(52) U.S. Cl. ...................... 417/569; 417/559; 137/855; 137/856
(58) Field of Search ................................. 417/569, 269, 417/559, 557–571; 137/855, 856

(56) References Cited

U.S. PATENT DOCUMENTS

| | | |
|---|---|---|
| 2,019,747 A | 11/1935 | Taylor |
| 2,151,746 A | 3/1939 | Cody |
| 2,434,734 A | 1/1948 | Buschmann |
| 2,908,287 A * | 10/1959 | Augustin ..................... 137/856 |
| 3,998,571 A * | 12/1976 | Falke .......................... 417/569 |
| 4,039,270 A | 8/1977 | Hiraga |
| 4,642,037 A | 2/1987 | Fritchman |
| 4,664,604 A | 5/1987 | Terauchi |
| 4,730,550 A | 3/1988 | Bramstedt et al. |
| 4,749,340 A * | 6/1988 | Ikeda et al. ................. 417/269 |
| 4,867,650 A * | 9/1989 | Ikeda et al. ................. 417/269 |
| 4,976,284 A * | 12/1990 | Hovarter ................... 137/512.4 |
| 5,249,939 A | 10/1993 | Takahashi |
| 5,252,276 A | 10/1993 | Shimizu |
| 5,603,611 A * | 2/1997 | Tarutani et al. ............. 417/269 |
| 5,722,818 A * | 3/1998 | Ohta et al. .................. 417/312 |
| 6,026,721 A | 2/2000 | Fukai |

FOREIGN PATENT DOCUMENTS

JP   8-261154   10/1996

\* cited by examiner

Primary Examiner—Teresa Walberg
Assistant Examiner—Thor Campbell
(74) Attorney, Agent, or Firm—Baker Botts L.L.P.

(57) ABSTRACT

A piston-type compressor has a cylinder block in which two or more compression chambers each permits a piston to reciprocate, so as to compress a refrigerant drawn into the cylinders from a suction chamber. The suction chamber is formed in an cylinder head and communicates fluidly with the cylinders through suction ports in a valve plate. Each of the suction ports is opened and closed by a suction reed valve. Each cylinder also has a valve stop portion and recess constructed for stopping movement of the suction reed valve when the valve reaches the open position separated from the valve plate. The valve stop construction includes a concave portion which enlarges an effective passage area thereof, and a stop portion which restricts the bending amplitude of the reed valve to an appropriate degree and is surrounded by the concave portion. By this structure, excess stress to the reed valve may be avoided and the noise and the vibration of the reed valve may be suppressed simultaneously.

1 Claim, 3 Drawing Sheets

FLUID DISPLACEMENT APPARATUS WITH SUCTION REED VALVE STOPPER

BACKGROUND OF THE INVENTION

1. Field of the Invention

The present invention relates to a piston-type compressor with a suction reed valve stopper adapted for use in a unit for air-conditioning vehicle compartments. In particular, the invention relates to a piston-type compressor with a suction reed valve stopper, which retains the movement of the suction reed valve during each suction stroke of the corresponding piston while permitting an adequate amount of opening for refrigerant suction and suppressing noisy vibration of the suction reed valves.

2. Description of Related Art

Referring to FIG. 3, a refrigerant compressor is shown in accordance with U.S. Pat. No. 4,664,604, which is incorporated herein by reference in its entirety. The compressor includes a closed, cylinder casing assembly 1 bracketed by a front housing 3 and a cylinder head 26 and provided with a cylinder block 2 at a cylinder head side and a hollow portion, such as crank chamber 1a. Front housing 3 is mounted on the left-side opening of casing assembly 1 to close the end opening of crank chamber 1a and fixed on casing assembly 1 by a plurality bolts (not shown). Cylinder head 26 and a valve plate 24 are mounted on the other end of casing assembly 1 by a plurality of bolts (not shown) to cover the end portion of cylinder block 2.

An opening 3a is formed in front housing 3 to receive a drive shaft 4 via a radial bearing 5 and mechanical seal 7. An annular sleeve 3b projects from the front end surface of front housing 3 and surrounds drive shaft 4 to define a shaft seal cavity 6. Mechanical seal 7 is positioned on drive shaft 4 within shaft seal cavity 6. Drive shaft 4 is supported rotatably by front housing 3 through radial bearing 5 which is disposed within opening 3a. Within front housing 3, drive shaft 4 is provided with a rotor 8. A thrust needle bearing 14 is positioned between the inner end surface of front housing 3 and the adjacent axial end surface of rotor 8 via a thrust race 13 to receive the thrust load that acts against rotor 8 and to ensure smooth motion. Drive shaft 4, which extends to sleeve 9 that is urged toward cylinder block 2 by a coil spring 12, is supported rotationally by a radial bearing 15, and supported by an adjusting screw 18, which is screwed into a threaded portion of a cylinder block 2 via a thrust needle bearing 16 and spring devices 17.

Thrust needle bearing 16 is placed between drive shaft 4 and spring devices 17 to ensure smooth rotation of drive shaft 4. Sleeve 9, which is placed between rotor 8 and the inner end of cylinder block 2, is carried slidably on drive shaft 4. Sleeve 9 supports a swash plate 10 for both nutational (i.e., wobbling) and rotation motion. Coil spring 12 surrounds drive shaft 4, and is positioned between the end surface of rotor 8 and one axial end surface of sleeve 9 to urge sleeve 9 toward cylinder block 2. Swash plate 10 is connected with rotor 8 through a hinge coupling mechanism for rotation in unison with rotor 8. Thus, rotor 8 has an arm portion 8a projecting axially outwardly from one side surface thereof, and swash plate 10 also has second arm portion 10a projecting toward arm portion 8a of rotor 8 from one side surface thereof.

In the compressor, as shown in FIG. 3, second arm portion 10a is formed separately from swash plate 10 and fixed on one side surface of swash plate 10. Arm portions 8a and 10a overlap each other and are connected to one another by a pin 11, which is provided on arm portion 8a and extends into a rectangular-shaped hole 10b formed through the second arm portion 10a of swash plate 10. In this manner, rotor 8 and swash plate 10 are hinged to one another. By this construction, pin 11 is disposed slidably in rectangular hole 10b and changes the slant angle of the inclined surface of swash plate 10. Cylinder block 2 has a plurality of annularly arranged cylinders 2a within which pistons 20 slide.

A known arrangement of such a compressor includes five cylinders, but fewer or more cylinders may be provided. Each piston 20 comprises a head portion 21 disposed slidably within cylinder 2a. Semispherical shoes 19 are disposed between each slide surface of swash plate 10 and face inner surface of pistons 20 for sliding along the side surface of swash plate 10. The rotation of drive shaft 4 causes swash plate 10 to rotate between shoes 19 and to move the inclined surface axially to the right and left, thereby reciprocating pistons 20 within cylinders 2a. Cylinder head 26 is configured to define a suction chamber 27 and discharge chamber 28. Valve plate member 24, together with cylinder head 26, is fastened to the end of cylinder block 2 by a plurality of screws (not shown), and is provided with a plurality of valved suction ports 22 connected between suction chamber 27 and respective cylinders 2a, and a plurality of valved discharge ports 23 connected between discharge chamber 28 and respective cylinders 2a. Gaskets 25 and 29 are positioned between cylinder block 2 and valve plate 24, and between valve plate 24 and cylinder head 26, respectively, to seal the mating surfaces of cylinder block 2, valve plate 24, and cylinder head 26.

Crank chamber 1a and suction chamber 27 are connected by a passageway 30, which comprises an aperture 30a formed through valve plate 24 and gaskets 25 and 29 and bore 30b formed in cylinder block 2. A coupling element 31 with a small aperture 31a is disposed in the one end opening of bore 30b, which faces crank chamber 1a, and a bellows element 34 containing gas and having a needle valve 34a is disposed in bore 30b. The opening and closing of small aperture 3a, which is connected between crank chamber 1a and bore 30b, is controlled by needle valve 34a, and the axial position of bellows element 34 is determined by frame element 33 disposed in bore 30b. At least one hole 33a is formed through frame 33 to communicate between aperture 30a and bore 30b.

In operation, drive shaft 4 is rotated by the engine of a vehicle through a pully arrangement (not shown), and rotor 8 is rotated together with drive shaft 4. The rotation of rotor 8 is transferred to swash plate 10 through the hinge coupling mechanism, so that, with respect to the rotation of rotor 8, the inclined surface of swash plate 10 moves axially to the right and left. Pistons 20, which are operatively connected to swash plate 10 by means of shoes 19, reciprocate within cylinders 2a. As pistons 20 reciprocate, the refrigerant gas, which is introduced into suction chamber 27 from the fluid inlet port 27a, is taken into each cylinder 2a and compressed. The compressed refrigerant gas is discharged to discharge chamber 28 from each cylinder 2a through a discharge port 23 and therefrom into an external fluid circuit, for example, a cooling circuit through the fluid outlet port 28a.

According to FIG. 4 and FIG. 5, suction reed valves 36', which are made of a resilient metallic material, such as a thin stainless steel plate, are formed to be resiliently movable between a closed position, in which they are in contact with valve plates 24 for closing suction ports 22, and an open position, in which suction reed valves 36' are separated from valve plates 24 in order to allow suction ports 22 to open.

When suction reed valves 36' are moved to the open position, the end of each suction reed valve 36' abuts against a stop formed at a bottom of a recess 2b' in the axial end face of the cylinder block 2. Thus, the amount of movement of suction reed valve 36' is determined by the depth of the bottom of recess 2b' as measured from the axial end face of cylinder block 2.

Thus, according to known construction methods, the suction reed valve stop is formed as the bottom of recess 2b'. Such recesses 2b' suffer from a shortage of effective passage area for the passage of the refrigerant during each movement of suction reed valve 36' from the closed position in contact with the valve plate 24 to the open position abutting against the bottom of recess 2b'. Because of this shortage of opening passage area, when the suction reed valve is opened, small, but strong, turbulence occurs on the reed valve surface on the cylinder slide. Due to this turbulence, each suction reed valve 36' is subject to a self-excited vibration. This vibration is caused by the flow of a refrigerant gas, which is drawn into the cylinder 2a during the suction stroke of the piston 20.

The vibration causes sound or noise to be generated at the evaporator of the external air-conditioning circuit. This vibration problem is particularly acute when the compressor is operating in a condition such that the amount of circulating refrigerant gas flow on the air-conditioning circuit is increasing (i.e., during operation at a high rotational speed). As a result, the vibration of suction reed valve 36' causes a sound, such as a clatter. If the depth of each recess 2b' is deepened, the above-mentioned vibration might be suppressed since the effective passage area of the recess 2b' is increased. However, if the range of the reed valve motion, i.e., the bending amplitude of the reed valve, is increased by increasing the depth of the bottom of the recess 2b', the durability of the reed valve will deteriorate considerably. This loss of reed valve durability results from the reed valve bending back and forth repeatedly, continuously, and very swiftly, during compressor operation, so that the bending amplitude directly effects the life time of the reed valve.

Referring to Japanese Patent Publication No. JP-A-8-261154, in order to prevent vibration of a suction valve and reduced suction performance, a reed valve with a stop-part structure that is easy to manufacture is disclosed. A locking part, engraved in a top end peripheral wall of a bore to regulate an opening in a reed part of a suction valve, is constituted by the first locking surface, which is touched by an end of the reed part and regulates the reed part's initial motion to be relatively shallow, and the second locking surface, that is formed deeper than the first stop surface and further interferes with the reed parts point end to regulate the reed part's deflection opening attitude. Under any operating condition, irregular self-excited vibration may be prevented while ensuring a proper reed part opening.

Although a locking part in the Japanese Patent Publication No. JP-A-8-261154 ensures a proper reed part opening to regulate the deformation of the suction valve for the refrigerant gas pressure, the structure of the locking part is not designed to extend the passage area of the refrigerant gas flow. Therefore, in this structure, as describe above, such a locking part suffers from a shortage of passage area during each movement of the suction valve from the closed position, in contact with the valve plate, to the open position, abutting against the bottom of suction valve. Due to the same mechanism explained above, each suction valve is subjected to a self-exited vibration too. This vibration is caused by the flow of a refrigerant gas that passes through the recess and detours around the reed valve.

SUMMARY OF THE INVENTION

An object of the present invention is to eliminate the above-mentioned defects encountered by the known piston-type compressors with suction reed valves.

Another object of the present invention is to provide a piston-type compressor equipped with an improved suction valve stop in order to suppress vibration of the suction reed valves and to allow a sufficient amount of refrigerant gas to flow into the compression chambers (i.e., cylinders) during the suction strokes of the pistons.

A further object of the present invention is to provide a piston-type compressor adapted to be used for forming a quiet, vehicle air-conditioning system.

In an embodiment of the present invention, a fluid displacement apparatus comprises a cylinder block having therein a plurality of cylinders. A housing closes an axial end of the cylinder block to form a suction chamber. A valve plate is positioned between the cylinder block and the housing, and has an inlet port for introducing a refrigerant gas to be compressed in the cylinders. A suction reed valve is positioned on one end surface of the valve plate. The suction reed valve has a fixed end adapted to be fixed to the valve plate and a free end thereof for closing and opening the inlet port. A limiting recess is formed in an inner wall of the cylinder block adjacent to an open end of each of the cylinders for limiting movement of the free end of the suction reed valve. The recess is formed of a valve stop portion and a concave recess portion. The valve stop portion is a convex-shaped and has a top end on the side of the cylinder block and predetermined depth for limiting the movement of the suction reed valve. The concave recess portion is surrounding the valve stop portion and has predetermined depth greater than a top end of the valve stop portion to extend the passage area for the introduced refrigerant gas flow.

Other objects, features, and advantages will be apparent to persons of ordinary skill in the art from the following description of the invention with reference to the accompanying drawings.

BRIEF DESCRIPTION OF THE DRAWINGS

The present invention may be more readily understood with reference to the following drawings, in which.

DETAILED DESCRIPTION OF PREFERRED EMBODIMENTS

Figure 3:
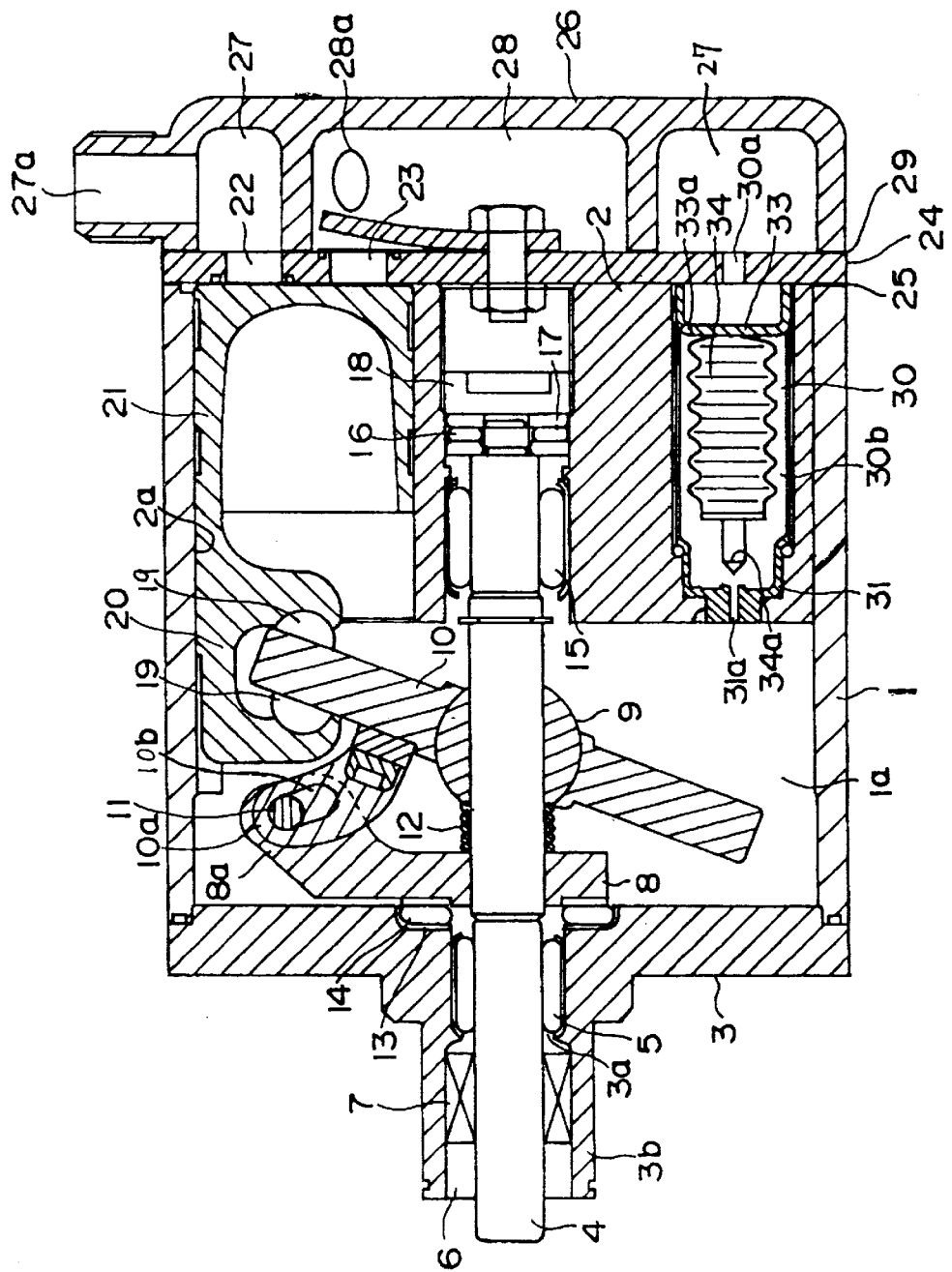
FIG. 3 is a longitudinal, cross-sectional view of a known swash plate type compressor.
Figure 4:
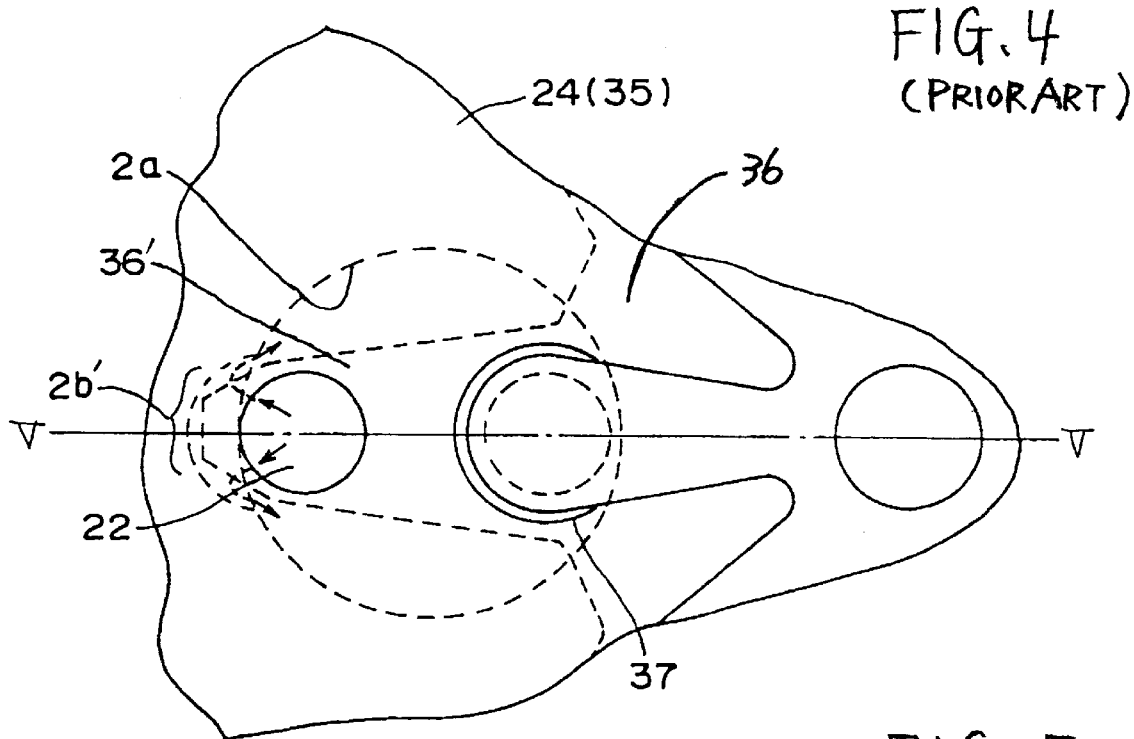
FIG. 4 is a plan view of the swash plate compressor of FIG. 3, in which valve plate construction is depicted without depicting a cylinder head.
Figure 5:
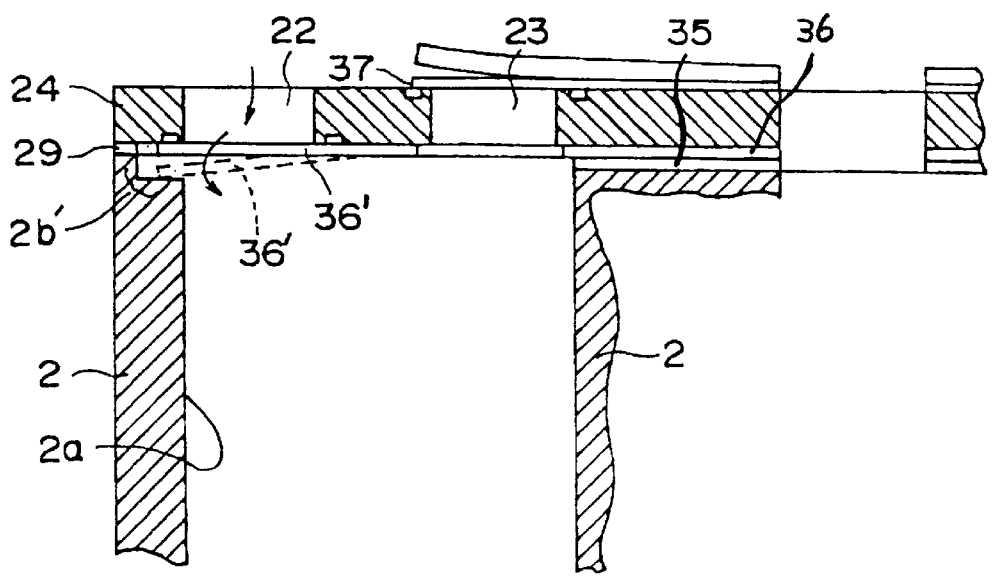
FIG. 5 is cross-sectional view taken along the line V—V of the compressor of FIG. 4.

The following is a description of the swash plate compressor according to the invention with reference to the accompanying figures. The improvements described in the following embodiments are applicable to swash plate compressors, such as that described with respect to FIG. 3. Therefore, the following explanation of these embodiments focuses on the differences in the structure of these embodiments as compared to those structures employed with respect to FIG. 4 and FIG. 5. A detailed description of components of known swash plate compressors that may be common to swash plate compressors of the present invention is omitted from the following description of preferred embodiments, and the same reference numerals used in FIGS. 3–5 to describe such components above are used in FIGS. 1–2 to identify common components in the description of preferred embodiments that follow.

Figure 1:
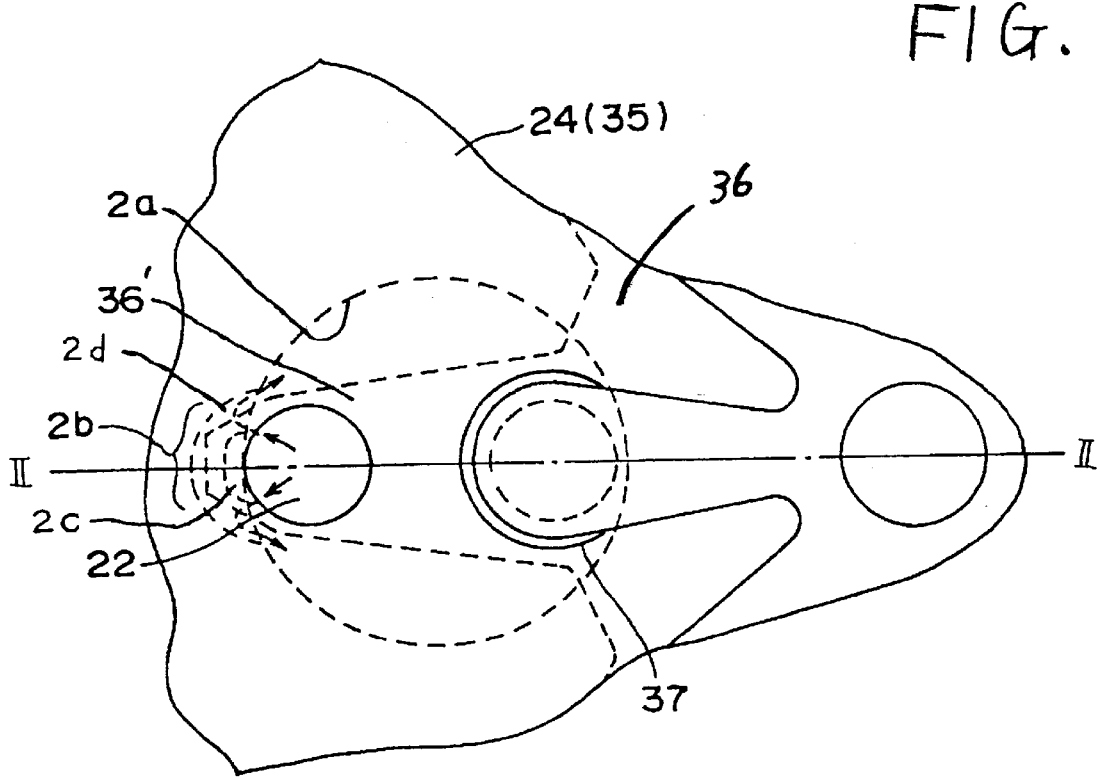
FIG. 1 is a plan, transparent view of a swash plate compressor in which the construction of a valve plate and the portion of the cylinder block surrounding a cylinder head, according to the present invention, is shown.

Referring to FIG. 1, a transparent plan view of an example of swash plate compressor is shown, in which the construction of the valve plate and cylinder block surrounding a cylinder head is according to the present invention.

Figure 2:
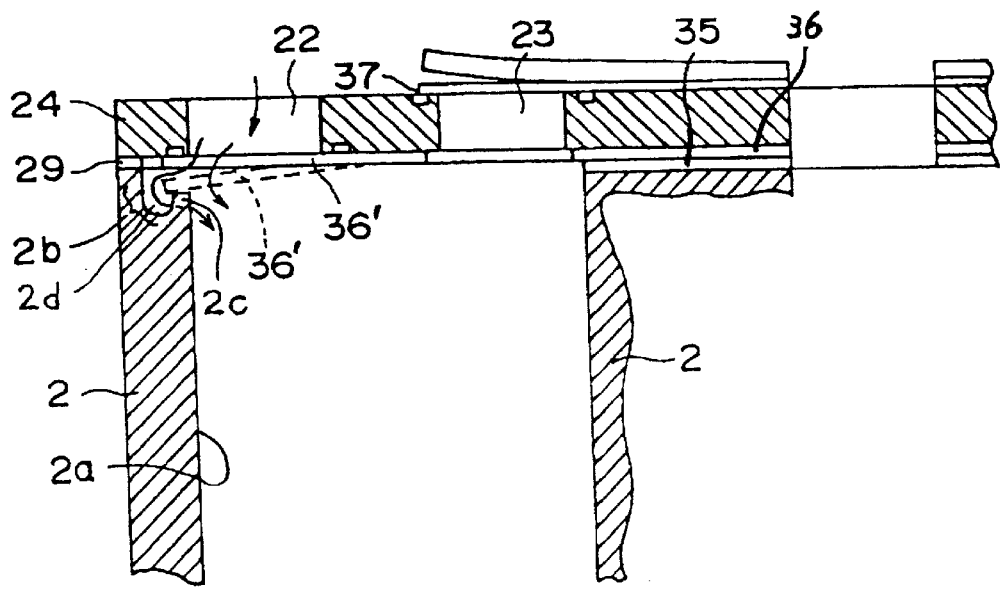
FIG. 2 is a cross-sectional view of a compressor embodying the present invention, along the line II—II of FIG. 1.

Referring to FIG. 2, a cross sectional view of a compressor embodying the present invention is shown, along the line II—II of FIG. 1. With reference to FIG. 3 again, as with the construction of a known swash plate compressor, a piston-type compressor may include a cylinder block 2 having a plurality of axial cylinders 2a formed therein as compression chambers to permit the reciprocation of pistons 20 therein to compress a refrigerant gas and at least one cylinder head 26 closing an axial end of cylinder block 2 to form suction chamber 27 which receives the refrigerant gas to be compressed. At least one cylinder head 26 includes inlet port 27a, through which the refrigerant gas is introduced from an external air conditioning circuit (not shown) into suction chamber 27. Further, a suction port 22 allows fluid communication between suction chamber 27 and compression chambers, such as cylinders 2a. Outlet port 28a permits the discharge of the compressed refrigerant from discharge chamber 28 to the external air-conditioning circuit, and a discharge port 23 allows fluid communication between chamber 28 and compression chambers, such as cylinder 2a. With reference to FIGS. 1 and 2, a suction reed valve means 36 is positioned on the other end face of valve plate 24 and includes a plurality of suction reed valves 36'.

Each of such suction reed valves 36' is adapted to move between a closed position in contact with the valve plate 24 for closing suction port 22 and an open position separated from plate 24 for opening suction port 22. Moreover, each suction reed valve 36' has sufficient length extending in a diametrical direction corresponding to one of cylinders 2a and is formed with a free end thereto. A plurality of limiting devices are formed as a plurality of recesses 2b in the axial end face of cylinder block 2 to restrain the free end of each of the plurality of suction reed valves 36' when each suction reed valve 36' is moved to the opening position.

Each concave recess 2b is formed in an inner wall of cylinder block 2a and formed of valve stop portion 2c and concave recess portion 2d. Valve stop portion 2c is convex-shaped having a top end on the side of cylinder block 2a, and is deeper than gasket 29. Valve stop portion 2c limits the deflection of the free end of suction reed valve 36' when each suction reed valve 36' opens the corresponding suction port 22. Concave recess portion 2d is formed around valve stop portion 2c and has a depth greater than a top end of valve stop portion 2c, so that the effective passage area through the entire recess 2b for the flow of suction gas introduced from suction port 22 may be extended.

Therefore, while the refrigerant gas is drawn into cylinder 2a, during a suction stroke, the free end of valve 36' makes contact with valve stop portion 2c which depth effectively restricts the bending amplitude of the reed valve 36', and concave recess portion 2d surrounding valve stop portion 2c permits a sufficient quantity of suction gas to be introduced into cylinder 2a. As a result, because the bending amplitude of reed valve 36' is limited to an appropriate degree, the durability of the reed valve 36' is ensured. At the same time, because the effective passage area through the recess 2b is increased by the concave recess portion 2d, the occurrence of turbulence around the reed valve is effectively prevented. Therefore, the noise and vibration of the reed valve may be suppressed.

Although the present invention has been described in connection with preferred embodiments, the invention is not limited there to. It will be understood by those skilled in the art that variations and modifications may be made within the scope and sprit of this invention, as defined by the following claims. While the present invention has thus far between described with respect to piston-type compressors, it will understood by those skilled in the art that this invention may be practiced in various other compressors. For example, these embodiments are possible for compressors that are of a wobble plate-type or a fixed displacement design.

What is claimed is:

1. A fluid displacement apparatus comprising:
   a cylinder block including a plurality of cylinders;
   a housing closing an axial end of said cylinder block to form a suction chamber;
   a valve plate positioned between said cylinder block and said housing and having an inlet port for introducing a refrigerant gas to be compressed into said suction chamber;
   a suction reed valve positioned on cylinder side surface of said valve plate, said suction reed valve having a fixed end adapted to be fixed to said valve plate and a free end thereof for closing and opening said inlet port; and
   a limiting recess formed in an inner wall of said cylinder block adjacent to an open end of each of said cylinders for limiting a movement of said free end of said suction reed valve, said recess having a concave shape and having a predetermined depth, and formed with a valve stop portion and a concave recess portion, said valve stop portion being convex-shaped and having a top end on the side of said cylinder block and predetermined depth for limiting said suction reed valve, said concave recess portion surrounding said valve stop portion and having predetermined depth greater than a top end of said valve stop portion, to extend passage area for refrigerant gas to be introduced into said cylinder.

* * * * *